United States Patent
Reial et al.

(10) Patent No.: US 11,419,016 B2
(45) Date of Patent: *Aug. 16, 2022

(54) METHODS AND ARRANGEMENTS FOR MEASUREMENT BASED MOBILITY

(71) Applicant: Telefonaktiebolaget LM Ericsson (publ), Stockholm (SE)

(72) Inventors: Andres Reial, Malmö (SE); Rui Fan, Beijing (CN); Qingyu Miao, Beijing (CN); Edgar Ramos, Kirkkonummi (FI); Johan Rune, Lidingö (SE); Claes Tidestav, Bålsta (SE); Stefan Wager, Espoo (FI); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/333,820

(22) PCT Filed: Sep. 30, 2016

(86) PCT No.: PCT/CN2016/101052
§ 371 (c)(1),
(2) Date: Mar. 15, 2019

(87) PCT Pub. No.: WO2018/058515
PCT Pub. Date: Apr. 5, 2018

(65) Prior Publication Data
US 2019/0261230 A1    Aug. 22, 2019

(51) Int. Cl.
*H04W 36/08*    (2009.01)
*H04W 36/00*    (2009.01)
(Continued)

(52) U.S. Cl.
CPC ... *H04W 36/0058* (2018.08); *H04W 36/0072* (2013.01); *H04W 36/0085* (2018.08);
(Continued)

(58) Field of Classification Search
CPC ......... H04W 36/0058; H04W 36/0072; H04W 36/00837; H04W 36/0085; H04W 36/08; H04W 36/305; H04W 36/32
See application file for complete search history.

(56) References Cited

U.S. PATENT DOCUMENTS 5,661,724 A    8/1997    Chennakeshu
8,219,097 B2    7/2012    Park et al.
(Continued)

FOREIGN PATENT DOCUMENTS

CN    1878374 A    12/2006
CN    101018386 A    8/2007
(Continued)

OTHER PUBLICATIONS

Ericsson, "W1 design for implicit advanced CSI reporting", 3GPP TSG-RAN WG1#86, Gothenburg, Sweden, Aug. 22, 2016, pp. 1-6, R1-167645, 3GPP.
(Continued)

*Primary Examiner* — Lester G Kincaid
*Assistant Examiner* — Dung L Lam
(74) *Attorney, Agent, or Firm* — Coats & Bennett, PLLC (57) ABSTRACT

The present disclosure relates to methods and arrangements for performing wireless device assisted handover form a source access node to a target access node. Performed in a wireless device, the disclosure presents a method for performing wireless device assisted handover from a source access node to a target access node in a wireless network. The method comprises performing (S31) one or more mobility measurements for corresponding candidate radio links
(Continued)

and selecting (S32), from the one or more candidate radio links, an initial target link based on the performed one or more mobility measurements. A first radio link measurement report, based on the one or more mobility measurements, identifying the initial target link, is transmitted (S33) to the source target node using a first radio link reporting mechanism whereupon communication over the initial target link is initiated (S34). A second radio link measurement report for the one or more candidate radio links and based on the same one or more mobility measurements, is transmitted (S35) on the initial target link using a second radio link measurement report different from the first radio link reporting mechanism.

10 Claims, 6 Drawing Sheets

(51) Int. Cl.
*H04W 36/32* (2009.01)
*H04W 56/00* (2009.01)
*H04W 36/36* (2009.01)

(52) U.S. Cl.
CPC ..... *H04W 36/00837* (2018.08); *H04W 36/32* (2013.01); *H04W 36/36* (2013.01); *H04W 56/001* (2013.01)

(56) References Cited

U.S. PATENT DOCUMENTS

| | | | |
|---|---|---|---|
| 9,025,564 B2 | 5/2015 | Kim et al. | |
| 9,439,206 B2 | 9/2016 | Hofmann et al. | |
| 10,327,183 B2 | 6/2019 | Reial et al. | |
| 2007/0032237 A1* | 2/2007 | Chang | H04B 17/382 455/436 |
| 2008/0020770 A1* | 1/2008 | Hofmann | H04W 36/22 455/438 |
| 2009/0117896 A1* | 5/2009 | Baldemair | H04W 56/0085 455/434 |
| 2009/0168718 A1 | 7/2009 | Wang et al. | |
| 2009/0175179 A1 | 7/2009 | Stewart | |
| 2009/0268707 A1* | 10/2009 | Pani | H04L 1/18 370/345 |
| 2010/0279679 A1 | 11/2010 | Young et al. | |
| 2010/0323631 A1* | 12/2010 | Martin | H04W 24/10 455/67.11 |
| 2013/0189988 A1* | 7/2013 | Alonso-Rubio | H04W 36/0072 455/436 |
| 2013/0201913 A1 | 8/2013 | Niemela | |
| 2014/0073329 A1 | 3/2014 | Kang et al. | |
| 2014/0080484 A1 | 3/2014 | Centonza et al. | |
| 2015/0031379 A1 | 1/2015 | Zhi et al. | |
| 2015/0078325 A1* | 3/2015 | Kishiyama | H04L 5/143 370/330 |
| 2015/0382258 A1 | 12/2015 | Schmidt et al. | |
| 2016/0029333 A1 | 1/2016 | Seo et al. | |
| 2016/0037425 A1* | 2/2016 | Van Lieshout | H04B 7/024 370/332 |
| 2016/0150435 A1 | 5/2016 | Baek et al. | |
| 2016/0183159 A1 | 6/2016 | Cui et al. | |
| 2016/0345216 A1 | 11/2016 | Kishiyama et al. | |
| 2016/0381610 A1 | 12/2016 | Pu et al. | |
| 2017/0054479 A1* | 2/2017 | Sang | C07D 413/10 |
| 2017/0215117 A1 | 7/2017 | Kwon et al. | |
| 2017/0366992 A1 | 12/2017 | Rune et al. | |
| 2018/0198590 A1 | 7/2018 | Lee et al. | |
| 2019/0200320 A1 | 6/2019 | Selvaganapathy et al. | |
| 2019/0215737 A1 | 7/2019 | Reial et al. | |
| 2019/0230536 A1 | 7/2019 | Da Silva et al. | |
| 2019/0281509 A1 | 9/2019 | Tidestav et al. | |
| 2019/0327629 A1 | 10/2019 | Zhang et al. | |

FOREIGN PATENT DOCUMENTS

| | | |
|---|---|---|
| CN | 101111084 A | 1/2008 |
| CN | 101292446 A | 10/2008 |
| CN | 101296163 A | 10/2008 |
| CN | 101400095 A | 4/2009 |
| CN | 101553020 A | 10/2009 |
| CN | 101617545 A | 12/2009 |
| CN | 102223664 A | 10/2011 |
| CN | 102281577 A | 12/2011 |
| CN | 102369760 A | 3/2012 |
| CN | 102711167 A | 10/2012 |
| CN | 102932835 A | 2/2013 |
| CN | 103220048 A | 7/2013 |
| CN | 103329593 A | 9/2013 |
| CN | 103428758 A | 12/2013 |
| CN | 104469873 A | 3/2015 |
| CN | 104488317 A | 4/2015 |
| CN | 105144614 A | 12/2015 |
| CN | 105228200 A | 1/2016 |
| EP | 2568739 A2 | 3/2013 |
| EP | 2747474 A | 6/2014 |
| WO | 2010148536 A1 | 12/2010 |
| WO | 2014164144 A1 | 10/2014 |
| WO | 2015137782 A1 | 9/2015 |
| WO | 2015164712 A1 | 10/2015 |
| WO | 2016014203 A1 | 1/2016 |
| WO | 2016053426 A1 | 4/2016 |
| WO | 2016129957 A1 | 8/2016 |
| WO | 2016198123 A1 | 12/2016 |
| WO | 2018053748 A1 | 3/2018 |
| WO | 2018058512 A1 | 4/2018 |
| WO | 2018058513 A1 | 4/2018 |
| WO | 2018058514 A1 | 4/2018 |

OTHER PUBLICATIONS

Intel Corporation, et al., "WF on beam management", Agenda item: 8.1.5, 3GPP TSG RAN1 #86, Gothenburg, Sweden, Aug. 22, 2016, pp. 1-2, R1-168119, 3GPP.

3rd Generation Partnership Project, "3rd Generation Partnership Project; Technical Specification Group Radio Access Network; Physical layer; Measurements (FDD) (Release 13)", Technical Specification, 3GPP TS 25.215 V13.0.0, Dec. 1, 2015, pp. 1-25, 3GPP.

ZTE Corporation, Performance Analysis on Early HO Preparation and Early HO CMD, 3GPP TSG-RAN WG2 Meeting #83, Barcelona, Spain, 19th, Aug. 19-23, 2013, R2-132375.

Ericsson, "Mobility Measurements and Procedures", 3GPP TSG-RAN WG2 #94, Nanjing, P.R. China, May 23, 2016, pp. 1-5, R2-164001, 3GPP.

* cited by examiner

METHODS AND ARRANGEMENTS FOR MEASUREMENT BASED MOBILITY

TECHNICAL FIELD

The present disclosure relates to methods and arrangements for performing wireless device assisted handover form a source access node to a target access node.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink. In order to support high data rates, LTE allows for a system bandwidth of 20 MHz, or up to 100 MHz when carrier aggregation is employed, and LTE will continue to evolve. In parallel to the LTE evolution, a new generation of cellular technology is being developed, a 5$^{th}$ generation system, 5G. One of the tasks for 5G is to improve throughput and capacity compared to LTE. This is in part to be achieved by increasing the sampling rate and bandwidth per carrier. 5G is also including use of higher carrier frequencies i.e., above 6 GHz.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, access node, AN, or access point, AP, is a general term for a radio network node capable of transmitting radio signals to a UE and receiving signals transmitted by a UE. In Wireless Local Area Network, WLAN, systems the wireless device is also denoted as a Station, STA.

Future communications networks are expected to use advanced antenna systems to a large extent. With such antennas, signals will be transmitted in narrow transmission beams to increase signal strength in some directions, and/or to reduce interference in other directions. The high frequencies and reliance of beamforming makes it challenging to maintain a reliable radio link. A narrow beam can quickly be lost in particular when combined with poor diffraction properties. Hence, beamforming based high-frequency radio access technologies are more susceptible to sudden changes in link quality or even loss of coverage, which may lead to significant delays and signaling until the wireless device can recover and find coverage again.

In LTE, some downlink reference signals are broadcasted in an always-on manner and over the full bandwidth, regardless of the presence or position of UEs in the system. These signals are called cell specific reference signals, CRS. A user equipment, UE, receiving the reference signal can measure the quality of neighbor cells for mobility purposes. Applying such continuous transmission of reference signals in all individual transmission beams in such a future cellular communications network may consume resources available for data, and generate a lot of interference in neighboring cells. Continuous transmissions also cause high energy consumption in the radio access points.

One option for reporting the measurements, also known as mobility reference signal measurements, from the UE back to the NW is to use RRC signaling. The information is aggregated at the L3 level and long report lengths may be supported that allow conveying information about many detected candidate link identities and their estimated signal strengths or qualities. Upon the reception of these measurement reports the network is capable of taking handover decisions, either to keep the UE in the cell, move it to another cell within the same frequency, another frequency and/or RAT. The link switch decision may then be taken by the NW considering a combination of link quality and network status parameters.

However another option for handling radio link with non-RRC reporting is also being investigated based on physical layer, L1-based, reporting using Uplink Synchronization Sequences, USS, a locally unique signal carrying a synchronization pilot and an identity. Alternatively, the L1-based reporting may use a physical random access channel (PRACH) preamble. The UE may be configured to send the USS to the target to indicate e.g. the best of a set of candidate DL beams through a preconfigured USS sequence. The UE is configured for performing mobility measurements of multiple candidate beams and, upon detecting the strongest beam; it should directly access the node it originates from. This is done by sending an USS whose uplink, UL, resources (Time/Frequency slot, sequence) are associated with the downlink, DL, beam; the association is preconfigured by the network. The receiving AN, e.g. the target AN, reserves UL resources for USS detection ahead of time, which allows the report to be conveyed with minimal latency. Upon receiving a USS report, an AN, e.g. the target AN, may signal in the DL the new serving link to allow sync parameter updates and other possible configuration changes at the UE. This L1-based method is a quicker way to access a target beam in scenarios where the SINR of the serving link can quickly drop due to shadowing and provides for an improvement in terms of robustness and latency, due to the fact that the UE sends the reporting directly to the target while in the RRC-based method the UE needs to send the measurements to the source, wait for a decision from the source and eventually receive an RRC Connection Reconfiguration from the serving link which might be under bad radio conditions.

RRC-based measurement reporting allows conveying reliable, rich measurement information from the UE to the network, but often with considerable signaling overhead and potentially high latency. Only using RRC signaling for mobility decisions, as in LTE, may create problems in some scenarios envisioned for the New Radio, NR, in 5G, such as when the UE is using a high gain beamforming in higher frequencies. There, the link quality provided by a beam can drop very quickly due to the aggressive shadowing effect that does not exist in frequencies when LTE is deployed and the narrow coverage of the beam. RRC signaling may therefore be unsuitable in scenarios in beam-formed systems where link quality diminishes rapidly outside the best coverage areas. The alternative approach, based on USS-reporting, may create problems in other scenarios and may entail complexity and resource drawbacks. In USS-based reporting, the UE can convey only a single link report at a time. Consequently, the beam switch or mobility procedure effectively becomes UE-controlled, since the best link detection and reporting from the UE determines the target link. Accordingly, there is a need to improve measurement reporting in support of mobility procedures.

SUMMARY

An object of the present disclosure is to provide solutions which seek to mitigate, alleviate, or eliminate one or more of the above-identified deficiencies in the art and to provide solutions improving signaling efficiency and link continuity during wireless device assisted handover.

This object is obtained by a method, for use in a wireless device, for performing wireless device assisted handover from a source access node to a target access node in a wireless network. The method comprises performing one or more mobility measurements for corresponding candidate radio links and selecting, from the one or more candidate radio links, an initial target link based on the performed one or more mobility measurements. A first radio link measurement report identifying the initial target link is transmitted to the target access node providing the initial target link using a first radio link reporting mechanism whereupon communication over the initial target link is initiated. A second radio link measurement report for the one or more candidate radio links is transmitted on the initial target link using a second radio link measurement report different from the first radio link reporting mechanism.

The disclosed method provides for link continuity in wireless networks where link quality diminishes rapidly outside a best coverage area, e.g., in high frequency beamforming system having narrow beam coverage. At the same time the ability to fully benefit from comprehensive mobility reports from the wireless device is maintained using a second reporting mechanisms different from the first when wireless communication has been established over the initial target link.

According to an aspect of the disclosure, the first radio link reporting mechanism is a physical layer radio link reporting mechanism.

According to another aspect of the disclosure, the second radio link reporting mechanism is a radio resource control, RRC, reporting mechanism.

Accordingly, the proposed method combines the advantages of the fast link establishment possible through a physical layer radio link reporting mechanism, e.g., an uplink synchronization signal, USS, based reporting mechanism with a maintained network control using the comprehensive measurement reporting of RRC signaling.

The above object of the disclosure is also obtained by a computer readable storage medium, having stored thereon a computer program which, when executed in a wireless device, causes the wireless device to execute any of the above mentioned aspects.

Likewise, the object of the disclosure is obtained by a wireless device that is configured for performing wireless device assisted handover from a source access node to a target access node. The wireless device comprises radio circuitry arranged for transmission and reception of radio signals. The wireless device further comprises processing circuitry configured to, using the radio circuitry, cause the wireless device to perform one or more mobility measurements for corresponding one or more candidate radio links and to select, from the one or more candidate radio links, an initial target link based on the performed one or more mobility measurements. The processing circuitry is further configured to transmit a first radio link measurement report identifying the initial target link using a first radio link reporting mechanism to the target access node providing the initial target link, initiate communication over the initial target link; and transmit a second radio link measurement report for the one or more candidate radio links on the selected target link using a second radio link reporting mechanism different from the first radio link reporting mechanism.

The wireless device and the computer program enable the corresponding advantages of those described above in relation to the method performed in a wireless device.

The object to provide solutions improving signaling efficiency and link continuity during wireless device assisted handover is also obtained by a method performed in an access node for performing wireless device assisted handover from a source access node to a target access node. The method comprises transmitting at least one signal for the purpose of mobility measurements for a corresponding candidate radio link and receiving a first radio link measurement report from a wireless device comprising an initial target link for the wireless device, wherein the first radio link measurement report is received through a first radio link reporting mechanism. The method further comprises performing handover of the wireless device to the initial target link; and receiving a second radio link measurement report for one or more candidate links, wherein the second radio link measurement report is received through a second radio link reporting mechanism different from the first radio link reporting mechanism.

According to a further aspect of the disclosure, a handover target link is determined based on the second radio link measurement report and, when the handover target link is different from the initial target link, a handover procedure for handover to the handover target link is initiated. Thus, the proposed solutions provides for determining a validated target link, wherein the validated target link is the initial target link or a replacement handover target link. Accordingly, a best-quality target link may initially be selected by the wireless device and then verified or replaced in a procedure wherein the network regains control of the mobility procedure. A further benefit is a much more signaling effective procedure, i.e., without a need for additional mobility reference signaling or request messages to the wireless device.

The above mentioned object of the disclosure is also obtained by a computer readable storage medium, having stored thereon a computer program which, when executed in an access node, causes the access node to execute any of the above mentioned method aspects.

Likewise, the object of the disclosure is obtained by an access node that is configured for performing wireless device assisted handover from a source access node to a target access node. The access node comprises radio circuitry arranged for transmission and reception of radio signals, communications circuitry arranged for transmission and reception of inter node communications signals and processing circuitry. The processing circuitry is configured to, using the radio circuitry, cause the access node to transmit at least one signal for the purpose of mobility measurements for a corresponding candidate radio link and receive a first radio link measurement report from a wireless device comprising an initial target link for the wireless device, wherein the first radio link measurement report is received through a first radio link reporting mechanism. The processing circuitry is further configured to cause the access node to perform handover of the wireless device to the initial target link; and to receive a second radio link measurement report for one or more candidate links, wherein the second radio link measurement report is received through a second radio link reporting mechanism different from the first radio link reporting mechanism.

The method performed in an access node, the computer program and the network node enable the corresponding advantages of those described above in relation to the method performed in a wireless device.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

a. is a flowchart illustrating exemplary method steps performed in a source access node.

b. is a flowchart illustrating exemplary method steps performed in a target access node.

DETAILED DESCRIPTION

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

In some embodiments the term "access node" is used and it can correspond to any type of access node or any network node, which communicates with a UE and/or with another network node. Examples of access nodes are NodeB, base station, multi-standard radio, radio node, eNodeB, network controller, radio network controller, base station controller, relay, donor node controlling relay, base transceiver station, access point, transmission points, transmission nodes, nodes in distributed antenna system, DAS etc.

Within the context of this disclosure, the terms "wireless device" or "wireless terminal" encompass any terminal which is able to communicate wirelessly with another device, as well as, optionally, with an access node of a wireless network, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

A downlink reference signal herein refers to a pre-defined signal, which is known to both transmitter and receiver. The downlink reference signal is typically characterized by a certain symbol or symbol sequence (typically a sequence of one or more symbols). The receiver monitors the radio channel for this pre-known symbol and when a match is found the reference signal is detected. The symbol sequence used in a reference signal is herein referred to as a reference signal sequence. As stated above, reference signals are sometimes used to identify some entity, such as individual beams in a beam sweep. If only the reference signal is used for this purpose, each beam in the sweep needs to be assigned to a unique reference signal sequence. A mobility reference signal is a downlink reference signals used in connection with mobility e.g. handover.

In support for higher frequencies in Next Generation, NG, communication systems, also known as New Radio, NR, beamforming is an essential component. Using antenna arrays at access nodes with the number of elements in the hundreds, fairly regular grid-of-beams coverage patterns with tens or hundreds of candidate beams per node may be created. The coverage area of an individual beam from such an array may be small, down to the order of some tens of meters in width. Channel quality degradation outside the current serving beam area may be significant and occur quickly due to the limited coverage area of the beam.

Figure 1:
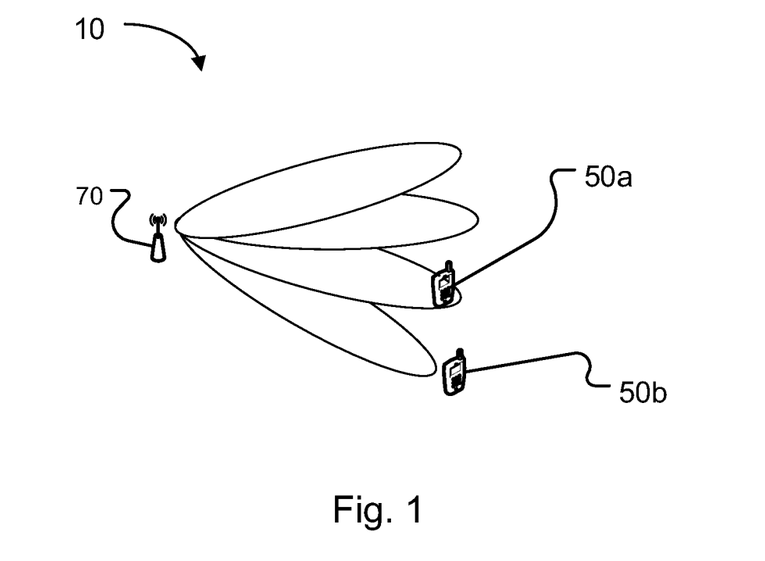
FIG. 1 illustrates a beam sweep transmitted from an access node.

As a consequence, mobility procedures in NG also need to address the problem of finding alternative candidate beams and not only a target AN. Beam sweep procedures are typically employed whereby a beam, i.e., a reference signal used for synchronization and mobility, is sequentially transmitted in a plurality of beam directions from an AN. FIG. 1 illustrates a beam sweep transmitted from an AN having one transmission point. Such a beam sweeping procedure with the purpose of synchronization and beam finding may be performed in conjunction with handover of a wireless device from one beam to another. A handover preparation procedure involving beam sweeping may involve candidate target beams from the wireless device's current serving access node and/or one or more other candidate target access nodes. It is also expected that one single access node might have several transmission points.

Different measurement reporting mechanisms are being investigated for the beam quality reporting: RRC based reporting and a PHY-layer based reporting using Uplink Synchronization Sequences, USS, or physical random access channel, PRACH, preamble, where a UE is configured to send the USS to the target node to indicate e.g. the best of a set of candidate DL beams through a preconfigured USS sequence or PRACH preamble sequence.

In RRC-based reporting, the UE is configured to measure so-called mobility reference signals and, upon the triggering of certain pre-configured events, e.g., serving beam lower than a first threshold while neighbor beam is higher than a second threshold, the UE sends an RRC measurement report message comprising comprehensive, reliable measurement information to a serving source AN, or AN-s, via an established RRC Connection. Based on that, the AN, or more specifically the network function managing mobility, can take educated mobility decisions since the report message will contain radio measurements with respect to multiple candidate nodes or beams associated to a certain UE at certain point in time.

Figure 2:
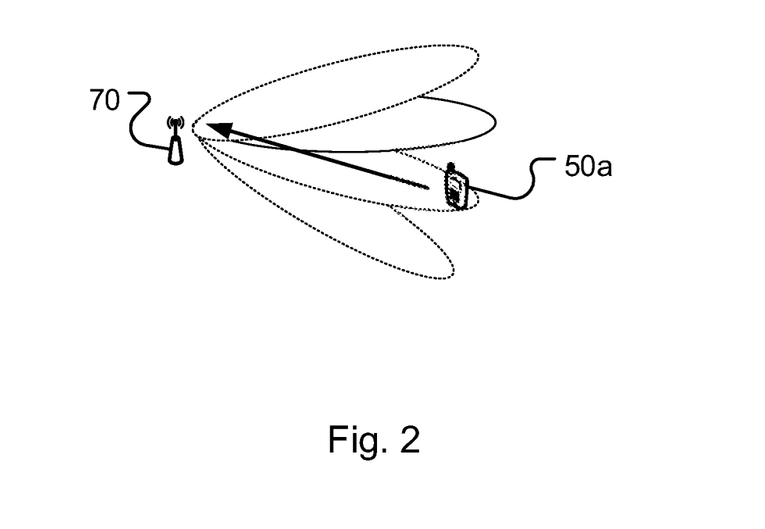
FIG. 2 illustrates a measurement report transmission from the wireless device.

In USS-based reporting the UE is configured to measure mobility reference signals of multiple candidate beams and, to send as a measurement report, an USS whose uplink, UL, resources, e.g., T/F slot and sequence, are associated with the downlink, DL, beam. FIG. 2 illustrates a wireless device reporting one beam of the beam sweep of FIG. 1. This method presents a quicker way to access a target beam in scenarios where the SINR of the serving link can quickly drop due to shadowing, to counteract the propagation challenges in a beam-based system. In terms of robustness and latency, there is an improvement compared to the RRC-based method due to the fact that the UE sends the reporting directly to the target access node, while in the RRC-based method the UE needs to send the measurements to the source access node, wait for a decision from the source and eventually receive a mobility command, e.g., an RRC Connection Re-configuration message, on the serving link which might be under bad radio conditions.

RRC-based measurement reporting allows conveying reliable, rich measurement information from the UE to the network, but often with considerable signaling overhead and potentially high latency. In USS-based reporting, the UE can convey only a single link report at a time. Consequently, the beam switch or mobility procedure effectively becomes UE-controlled and may be less reliable than the RRC-based procedure. Thus, using RRC signaling for mobility decisions entails problems in some NG scenarios, but the alternative approach may also be problematic in other NG scenarios.

This methods and arrangements presented in this disclosure take advantage of the benefits offered by RRC-based reporting and USS-based reporting whilst reducing the associated draw-backs. The idea is to configure a UE to trigger a combination of reporting mechanisms for mobility related reporting.

As is clear from the above sections, the disclosed solutions are particularly beneficial in wireless networks employing high-gain beamforming, where the candidate links are the different beam configurations that would be used for communication with the wireless device, as illustrated in FIG. 1. However, the principles are also equally applicable to more traditional, cell- and sector-based deployments. Furthermore, in the disclosure, the terms 'links' and 'beams' are used interchangeably and when referring to a beam this represents one example of a link.

Figure 3:
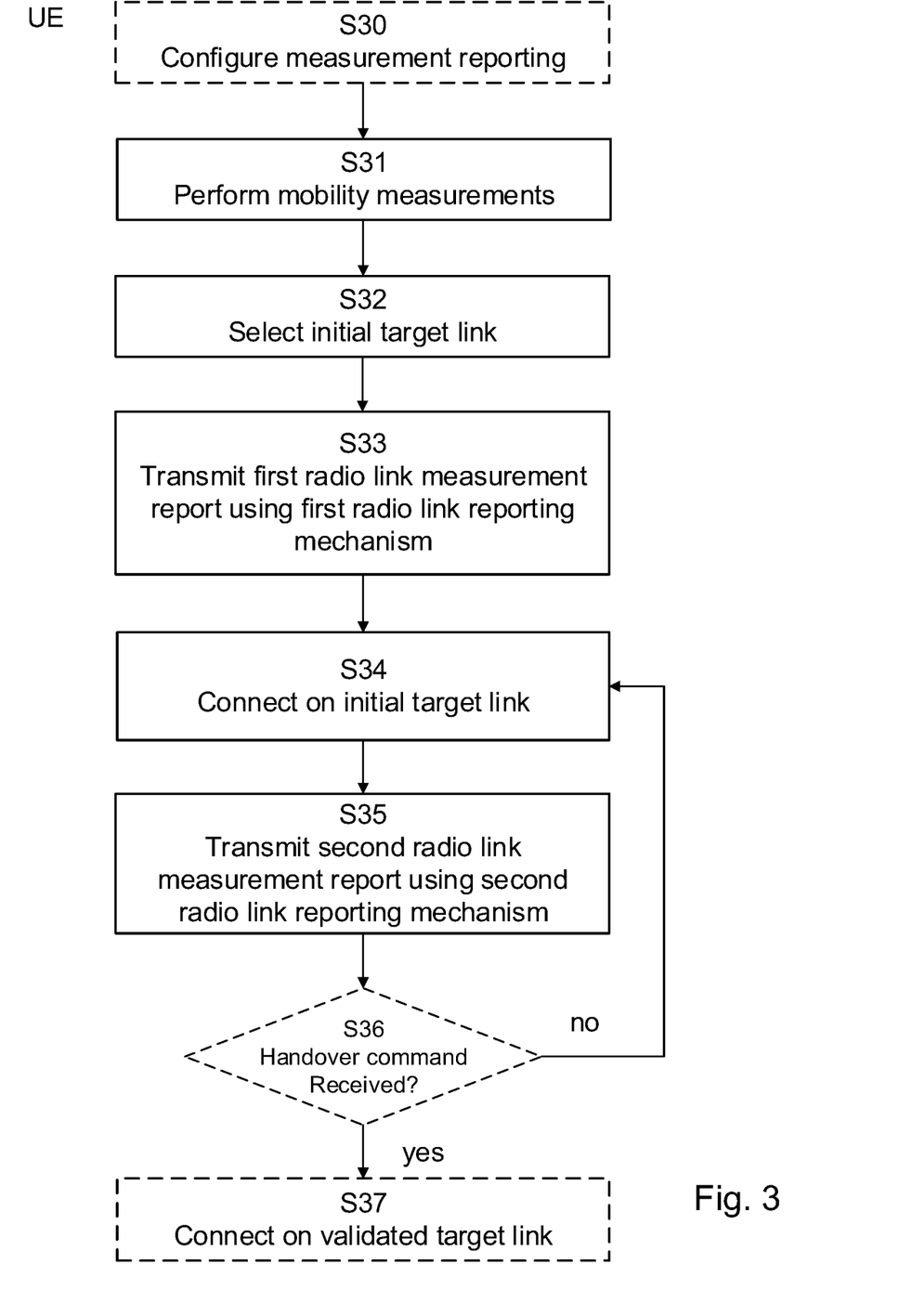
FIG. 3 is a flowchart illustrating exemplary method steps performed in a wireless device.

FIG. 3 illustrates, in a flowchart, exemplary method steps performed in a wireless device for performing wireless device assisted handover from a source access node to a target access node. The method comprises to perform S31, in the wireless device, one or more mobility measurements for corresponding one or more candidate radio links. According to an aspect of the disclosure, the performing of one or more mobility measurements comprises measuring suitable downlink signals, e.g., mobility reference signals, MRS, for corresponding candidate radio links. The wireless device is configured for such MRS measurements and reporting, either ahead of time or immediately before the measurements, e.g., through receiving S30 a configuration from a serving access node. The serving access node will in the following be denominated as a source access node, i.e., the access node to which the wireless device is connected when a mobility procedure is initiated. In general, the wireless device measures the mobility reference signals of multiple candidate links, i.e., performs mobility measurements for corresponding candidate links. According to an aspect of the disclosure, the wireless device derives downlink, DL, synchronization settings from the downlink mobility reference signals and stores these DL synchronization settings for the candidate radio links, i.e., with respect to all detected candidate links. The mobility reference signals may consist of synchronization sequences to obtain time and frequency (T/F) alignment with respect to candidate link signals and link identification sequences to distinguish the different detected candidate link identities. The mobility reference signals may be used to trigger measurement reports. Usually, the triggering conditions are set so that the wireless device sends a report when a candidate link is deemed better than the currently serving link.

Using the result of the mobility measurements for the candidate links, the wireless device selects S32, from the one or more candidate radio links, an initial target link based on the performed one or more mobility measurements, e.g., by detecting and selecting the best-quality link being equivalent to the strongest beam. After determining the initial target link, the DL synch for that link is retrieved, e.g., from the stored list.

The wireless device transmits S33 a first radio link measurement report, based on the one or more mobility measurements, identifying the initial target link to a receiving target access node using a first radio link reporting mechanism. The target access node providing the initial target link is one recipient of the first radio link measurement report, but according to aspects of the disclosure the report may also be transmitted to, or perceived/received by, further target access nodes in the wireless communication system and also to the serving access node also known as source access node. According to an aspect of the disclosure, the first radio link reporting mechanism is a physical layer radio link reporting mechanism and the reporting of the initial target link comprises reporting the best-quality link using a fast L1 reporting approach, e.g. by transmitting a USS whose parameters (sequence, T/F resources) map to the best-quality link identity according to a previous configuration. Thus, according to an aspect of the disclosure, an uplink synchronization sequence, USS, provides the physical layer radio reporting mechanism. For the USS based reporting, the wireless device may use a DL timing reference obtained from the best-quality link mobility reference signal, i.e., the initial target link. This allows the associated target access node to estimate the timing advance, TA, for the initial target link and to avoid additional synchronization procedures, which is particularly beneficial if the wireless device controlled handover is invoked due to serving/source link degradation. The wireless device initiates S34 communication over the initial target link, e.g., by transmitting a USS according to the initial target's DL timing and receives a TA command in the DL control channel. The link to the initial target is thus established.

Re-using the mobility measurements performed for the one or more candidate radio links, the wireless device transmits S35 a second radio link measurement report, based on the same one or more mobility measurements for the one or more candidate radio links, to the source access node using a second radio link reporting mechanism different from the first radio link reporting mechanism. As previously mentioned, the performing of mobility measurement comprises measuring downlink reference signals for corresponding candidate radio links, thus providing a comprehensive set of measurements that may be sent in the second radio link measurement report. According to an aspect of the disclosure, the second radio link reporting mechanism is a radio resource control, RRC, reporting mechanism. Thus, the wireless device also sends an RRC measurement report using the initial target link, providing identity and quality information for several candidate links. The RRC measurement report is potentially based on a request from the network/access node and sent via the newly established initial serving link. The report is based on the already performed measurements, providing identity and quality information for several candidate links. In an alternative embodiment, there may be network configured criteria for when the wireless device should send the RRC measurement report. For instance, in case the difference between best and second best measured MRS is below a certain threshold, the wireless device should send the RRC measurement report. Alternatively, if the second best measured candidate link is above an absolute threshold, the wireless device should send the RRC measurement report. In a further alternative embodiment, the wireless device may send the RRC report unless instructed otherwise, i.e., it omits sending the RRC measurement report if requested not to send is received from the network.

The wireless device transmits the RRC measurement report using the established UL and DL timing via the initial target link and tries to receive a handover command or link switch command. In typical embodiments, the handover command is a layer 3, L3, command, but it could also be on layer 2, L2. Thus, the wireless device checks whether there is an additional handover command, e.g., signaled by RRC reconfiguration, provided via the initial target link now representing the new serving link. According to an aspect of the disclosure, the handover command comprises a validated target link, wherein the validated target link is the initial target link or a handover target link different from the initial target link. Thus, based on receipt of the handover command, the wireless device initiates S36 communication on a validated target link. However, such initiating of communication may also comprise continuing communication on the established connection, i.e., the initial target link. If a command is received which specifies a MRS index corresponding to a handover target link, the wireless devices retrieves the corresponding downlink synchronization settings, e.g., from the stored list, and repeats the UL timing establishment process with respect to the handover target link.

In some deployments it may happen that some of the candidate radio links measured by the wireless device belong to access nodes that are neighbors of the serving access node at the time of the measurements, i.e., the source access node, but that they are not necessarily neighbors of the target access node providing the initial target link. For such deployments, the wireless device may send the RRC report to the source access node. The RRC report sent to the source access node may, according to an aspect of the present disclosure, be sent in addition to the report sent on the initial target link or as an alternative. Another option is that the target access node providing the initial target link relays the RRC to the source access node and receives a handover command from the source access node. With this alternative, the network will maintain control of the handover procedure, but without being dependent on source link quality. Another further option is that mapping information is exchanged between the target access node and the source access node together with wireless device context transfer or during the measurement reporting configuration, e.g., when configuring the performing of a beam sweep. The target access node will then be able to benefit candidate link information in the second radio link measurement report, without a need for additional reporting from the wireless device.

Figure 4:
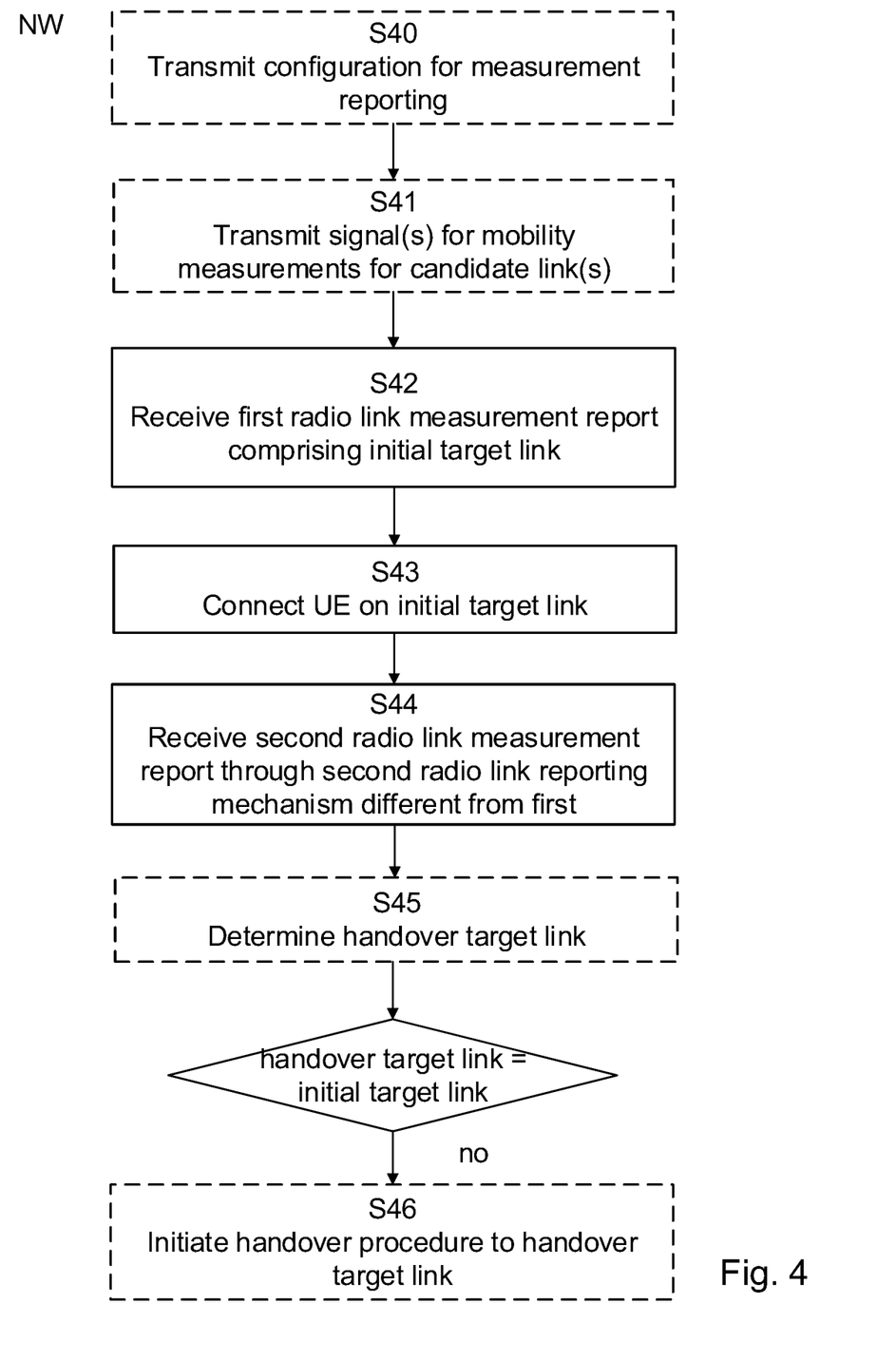
FIG. 4 is a flowchart illustrating network aspects of exemplary method steps.
Figure 4A:
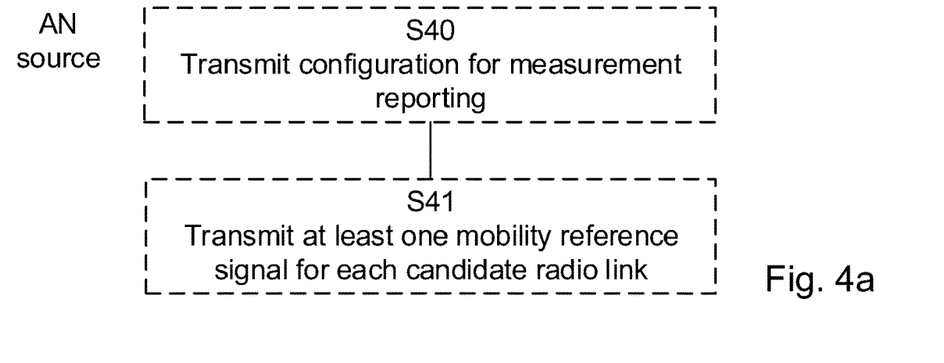
Figure 4B:
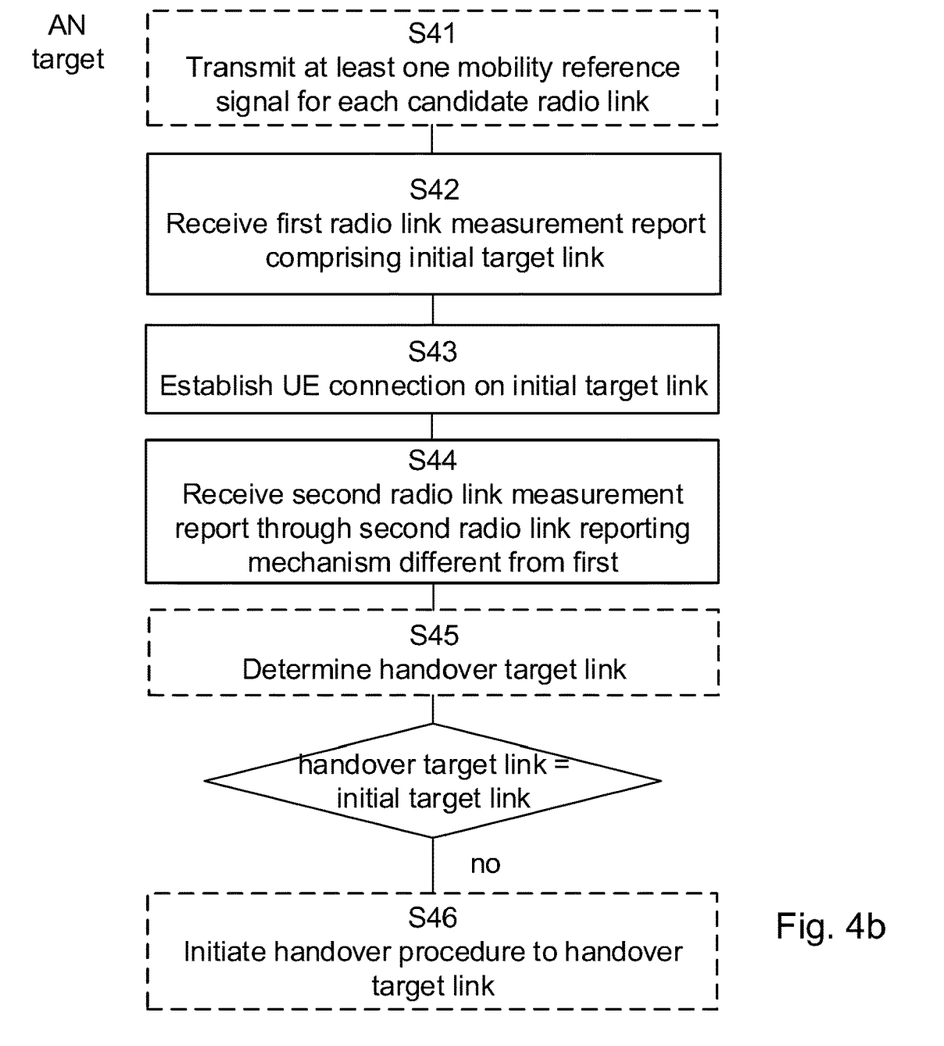

FIG. 4 illustrates, in a flowchart, network aspects of the above discussed method. The disclosed operations are performed in network nodes providing a radio interface to a wireless device, i.e., one or more access nodes representing a source access node and a target access node for a wireless device assisted handover. FIG. 4a and FIG. 4b disclose the exemplary operations from the perspective of a source access node and a target access node. However, the present disclosure is not limited by the exemplary distribution of operations suggested in FIGS. 4a and 4b. In the following, the network perspective will be presented with reference to the operations disclosed in FIGS. 4, 4a and 4b without specific reference to any one figure.

The method performed in an access node comprises, according to an aspect of the disclosure, transmitting S41 at least one signal for the purpose of mobility measurements for a corresponding candidate radio link. Turning back to the beam sweep presentation given for FIG. 1, it will be understood that there are usually a number of candidate links provided by each target node. Hence, commonly a plurality of signals would be transmitted to enable mobility measurements for a plurality of candidate links. According to an aspect of the disclosure, the access node transmits S40 a configuration to the wireless device for configuring the wireless device performance of the mobility measurements. The configuration instructions configures the wireless device for performing one or more mobility measurements for corresponding one or more candidate radio links, e.g., to measure and report downlink, DL, mobility reference signal quality in multiple candidate links.

In a network comprising at least a source access node and a target access node, the network, i.e., the access node of the network, transmits S41 one or more mobility reference signals, i.e., downlink reference signals corresponding to each candidate link according to an aspect of the disclosure. The mobility reference signals may be scheduled specifically for the given wireless device measurement session or scheduled as part of a periodic transmission pattern. An alternative to scheduling the candidate MRS transmissions specifically for a given wireless device measurement session, is that the mobility reference signal transmissions are repetitive on a permanent or semi-permanent basis and that the wireless device is configured to measure on a certain set of repetitive mobility reference signal transmissions.

According to an aspect of the present disclosure, the mobility reference signals are mapped to uplink synchronization signals, USS, according to predefined rules or through signaling from the network, so that the access nodes transmitting candidate mobility reference signals also have knowledge of the mapping relationship between each MRS and an USS. USS reception resources are reserved in the access node that transmits a mobility reference signal. All access nodes transmitting signals for the purpose of mobility measurements, or a subset that is likely to successfully receive the USS, may be invoked in this process.

Following transmission S41 of one or more signals for the purpose of mobility measurements, e.g., mobility reference signals, the access node receives S42 first radio link measurement reports over a first radio link reporting mechanism. The first radio link measurement report comprises an initial target link.

According to an aspect of the present disclosure, the first radio link reporting mechanism is a physical radio link reporting mechanism. According to a further aspect of the disclosure, an uplink synchronization signal, USS, provides the physical layer radio link reporting mechanism.

In the following discussion, an embodiment where the first radio link measurement report is provided by means of a USS is used for the sake of simplifying the presentation. However, the present disclosure is not limited to such an embodiment nor should the specific scenarios disclosed below be considered as limited USS-based reporting. Furthermore, a target access node providing the initial target link will be presented as a wireless device selected target access node or USS selected target node.

Every access node that transmits a mobility reference signal must also be prepared to receive a USS. The allocation of that USS reception slot is determined by the network, and conveyed to the wireless device in a way similar to the allocation of mobility reference signals. Hence, the network reserves USS reception resources in the one or multiple candidate access nodes that transmitted the respective mobility reference signals. For each access node, at least some of the USS reception resources should be located in the time domain after a potential expiration of the above mentioned timer (or after the estimated time of a maximum number of Hybrid Automatic Repeat Request, HARQ, and possible higher protocol layer retransmission attempts). If the mobility reference signals are repeatedly transmitted, allocated USS resources must also occur repetitively with the same period.

The access node that receives the first radio link measurement report comprising the initial target link is a target access node for the handover procedure. In response to receipt of the initial target link, the target access node initiates a handover procedure and performs S43 handover of the wireless device to the initial target link. The target access node may also send information to the source access node about the initiated handover procedure.

According to an aspect of the disclosure, the first radio link measurement report could also be available to the serving access node, also known as the source access node. This would, for example, be possible in that the source access node could detect the USS transmitted by the wireless device to the target access node or in that the wireless device transmits an omni-directional USS. Gaining knowledge of the initial target link, would allow the source access node to proactively forward user data to the target access node providing the initial target link or forward information considered relevant for a handover decision, e.g., load situation of all neighbor nodes, to reduce data transmission interruption period.

In order to set up a connection on the initial target link, i.e., to communicate with the target access node, the wireless device may need to be assigned a new MAC scheduling ID, also known as Radio Network Temporary Identifier, RNTI. This could be included in the Random Access Response message transmitted from the network to the wireless device in response to the USS. Also, there may be a need for coordination between source access node and target access nodes to ensure that the target access node can communicate with the wireless device using the same configuration as the source access node. This could be achieved using internode signaling, e.g., combined with the signaling to activate transmission of signals for mobility measurements from candidate target nodes.

The network, i.e., the target access node providing the initial target link and possibly also the source access node, also receives S44 a second radio link measurement report, e.g., an RRC report. The RRC report provides a list of candidate link identities detected by the wireless device and their link qualities. The list may be a comprehensive list of the candidate links, but at least contains multiple best candidate links as identified by the UE. If the RRC report is received successfully, the receiving access node, i.e., the target access node providing the initial target link, determines a handover target link for the wireless device based on the reported candidate link qualities and e.g., the load in the different access nodes associated with these candidate links. The second radio link measurement report represents a follow-up measurement report offered to the network in order to reinstate network control for the handover procedure. According to aspects of the disclosure, the target access node may request the sending of the second radio measurement report, e.g., by sending a request message, or decline the sending of the second radio measurement report by sending a no-report indication or message. However, it is expected that the second radio measurement report will be received in the target access node shortly after a wireless device connection has been established on the initial target link.

With receipt of the second radio link measurement report, e.g., an RRC report, the network, i.e., the target access node, then receives an RRC report with additional candidate link quality information from the same measurements. The target access node checks whether there exist handover target links that are better than the initial target link reported by the wireless device, e.g., according to a predefined metric. A "better" target link may be one that has almost as good, or sufficiently high, signal quality, but is associated with an access node where the traffic load is lower and/or other resources, e.g. signal processing capacity, are more plentiful. The network determines S45 a handover target link and if this handover target link differs from the initial target link and represents a better link, the network performs handover of the wireless device from the initial target link to the handover target link. If the initial target link connection is maintained, network control of the handover procedure is revoked in that the initial target link is validated through the processing of the additional second radio link measurement report. According to an aspect of the disclosure, the handover or switching to the handover target link is performed via regular RRC reconfiguration.

According to one aspect of the disclosure, the final handover decision is made by the target access node providing the initial target link. As mentioned in the wireless device discussion above, it may happen that some of the candidate radio links measured by the wireless device belong to access nodes that are neighbors of the serving access node at the time of the measurements, i.e., the source access node, but that they are necessarily neighbors of the target access node providing the initial target link. In order to enable handover also to candidate links of other target nodes that may not have neighbor relations with the target access node, the source access node needs to provide the initial target access node with information so that it can map the candidate links to respective candidate target nodes. With this additional information, the target access node can determine a handover target link, make the handover decision and send the handover command to the wireless device and possibly to a handover target node providing the handover target node. If the target access node providing the initial target link does not have a communications interface, e.g., an X2 connection, with the access node providing the handover target node, the target access node needs to send a request to the source access node to forward signaling from the target access node to the target node providing the handover target link, i.e., the final, validated target link.

Alternatively, the target access node providing the initial target link may relay the RRC or forward content of the RRC report to the source access node and receive a handover command from the source access node. Thus, the handover decision is made in the source access node that also generates a handover command. With this alternative, the network will maintain control of the handover procedure, but without being dependent on source link quality. Another further option is that mapping information is exchanged between the target access node and the source access node together with wireless device context transfer or during the measurement reporting configuration, e.g., when configuring the performing of a beam sweep. The target access node will then be able to benefit candidate link information in the second radio link measurement report, without a need for additional reporting from the wireless device.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIGS. 3, 4, 4a and 4b. The particular sequence of such executable instructions or associated data structures represents examples of corresponding acts for implementing the functions described in such steps or processes.

Figure 5:
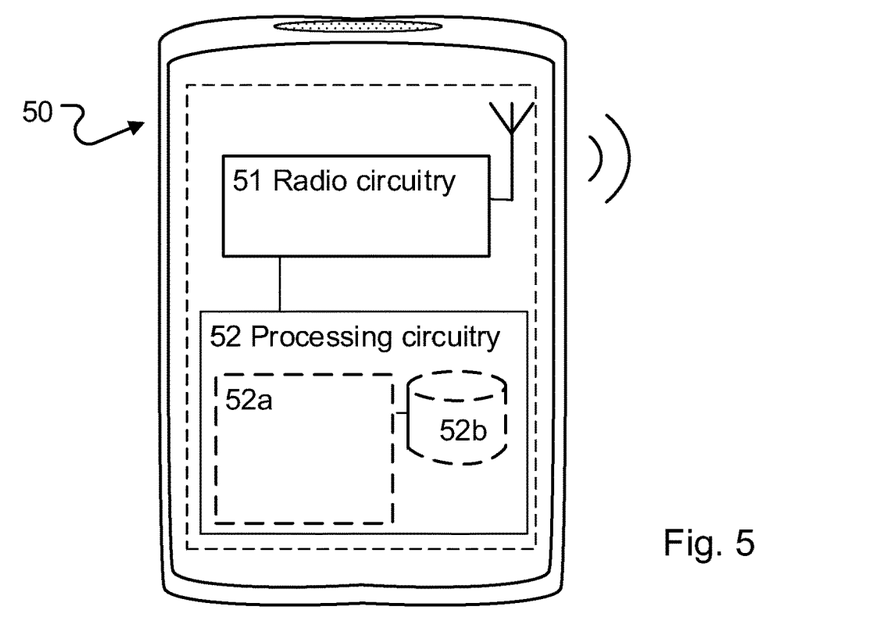
FIG. 5 illustrates an example wireless device configuration.

FIG. 5 is an example configuration of a wireless device, which may incorporate some of the example embodiments discussed above. The wireless device is configured for performing wireless device assisted handover from a source node to a target node. As shown in FIG. 5, the wireless device comprises radio circuitry 51 arranged for transmission and reception of radio signals. It should be appreciated that the radio circuitry 51 may be comprised as any number of transceiving, receiving, and/or transmitting units or circuitry and that the radio circuitry may operate in half-duplex or full duplex transmission mode. It should further be appreciated that the radio circuitry 51 may be in the form of any input/output communications port known in the art.

The wireless device further comprises processing circuitry arranged to control operation of the wireless device. In particular, the processing circuitry 52 is configured to cause the wireless device to perform one or more mobility measurements for corresponding one or more candidate radio links, and to select, from the one or more candidate radio links, an initial target link based on the performed one or more measurements. The processing circuitry 52 also causes the wireless device to transmit a first radio link measurement report, based on the one or more mobility measurements, identifying the initial target link using a first radio link reporting mechanism to the source node, to initiate communication over the initial target link, and to transmit a second radio link measurement report for the one or more candidate radio links and based on the same one or more mobility measurements, on the selected target link using a second radio link reporting mechanism different from the first radio link reporting mechanism.

According to an aspect of the disclosure, the processing circuitry comprises a processor 52a and a memory 52b. The processor 52a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 52b may further be configured to store received or transmitted data and/or executable program instructions. The memory 53b may be any suitable type of computer readable memory and may be of volatile and/or non-volatile type.

Figure 6:
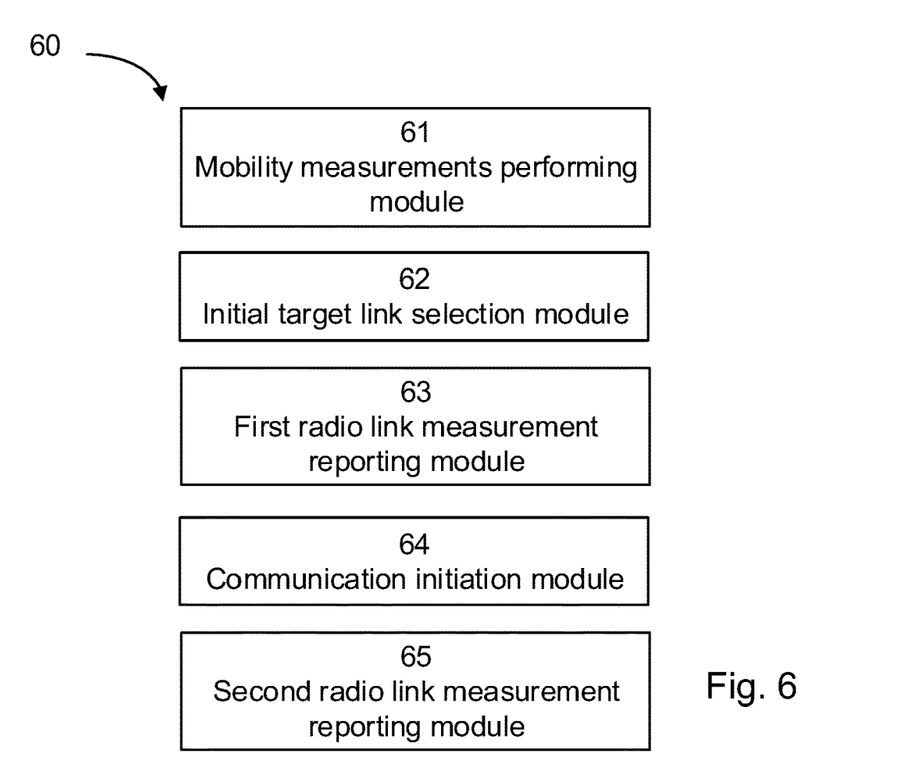
FIG. 6 illustrates an example wireless device configuration.

FIG. 6 illustrates an embodiment of a wireless device 60 configured for performing wireless device assisted handover from a source node to a target node. The wireless device 60 comprises a mobility measurements performing module 61 for performing mobility measurements for corresponding one or more candidate radio links, an initial target link selection module 62 configured to select, from the one or more candidate radio links, an initial target link based on the performed one or more mobility measurements, a first radio link measurement reporting module 63 configured to transmit a first radio link measurement report, based on the one or more mobility measurements, identifying the initial target link using a first radio link reporting mechanism to the source access node, a communication initiation module 64 configured to initiate communication over the initial target link, and a second radio link measurement reporting module 65 configured to transmit a second radio link measurement report for the one or more candidate radio links and based on the same one or more mobility measurements, on the initial target link using a second radio link reporting mechanism different from the first radio link reporting mechanism.

Figure 7:
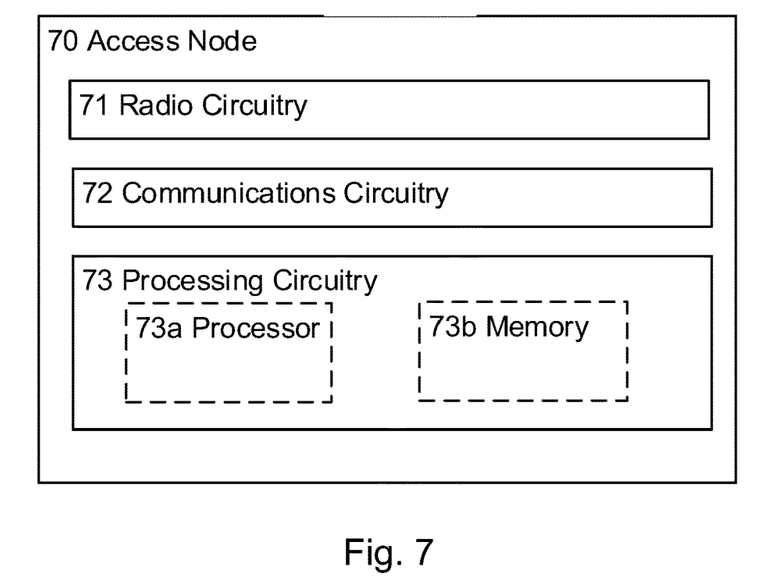
FIG. 7 illustrates an example node configuration for an access node.

FIG. 7 is an example configuration of an access node 70, which may incorporate some of the example embodiments discussed above. The access node 70 is configured for performing wireless device assisted handover from a source node to a target node. As shown in FIG. 7, the access node comprises radio circuitry 71 arranged for transmission and reception of radio signals. It should be appreciated that the radio circuitry 71 may be comprised as any number of transceiving, receiving, and/or transmitting units or circuitry and that the radio circuitry may operate in half-duplex or full duplex transmission mode. It should further be appreciated that the radio circuitry 71 may be in the form of any input/output communications port known in the art.

The access node may further comprise communications circuitry 72 arranged to transmit and/or receive communications signals from one or more further radio network nodes. It should further be appreciated that the communications circuitry 72 may be in the form of any input/output communications port known in the art.

The access node further comprises processing circuitry arranged to control operation of the access node. In particular, the processing circuitry 73 is configured to cause the access node to perform transmit at least one signal for the purpose of mobility measurements for a corresponding candidate radio link, to receive a first radio link measurement report from a wireless device comprising an initial target link for the wireless device, wherein the first radio link measurement report is received through a first radio link reporting mechanism, to perform handover of the wireless device to the initial target link; and to receive a second radio link measurement report for one or more candidate links, e.g., comprising the initial target link, wherein the second radio link measurement report is received through a second radio link reporting mechanism different from the first radio link reporting mechanism. According to an aspect of the disclosure, the processing circuitry comprises a processor 73a and a memory 73b. The processor 73a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 73b may further be configured to store received or transmitted data and/or executable program instructions. The memory 73b may be any suitable type of computer readable memory and may be of volatile and/or non-volatile type.

Figure 8:
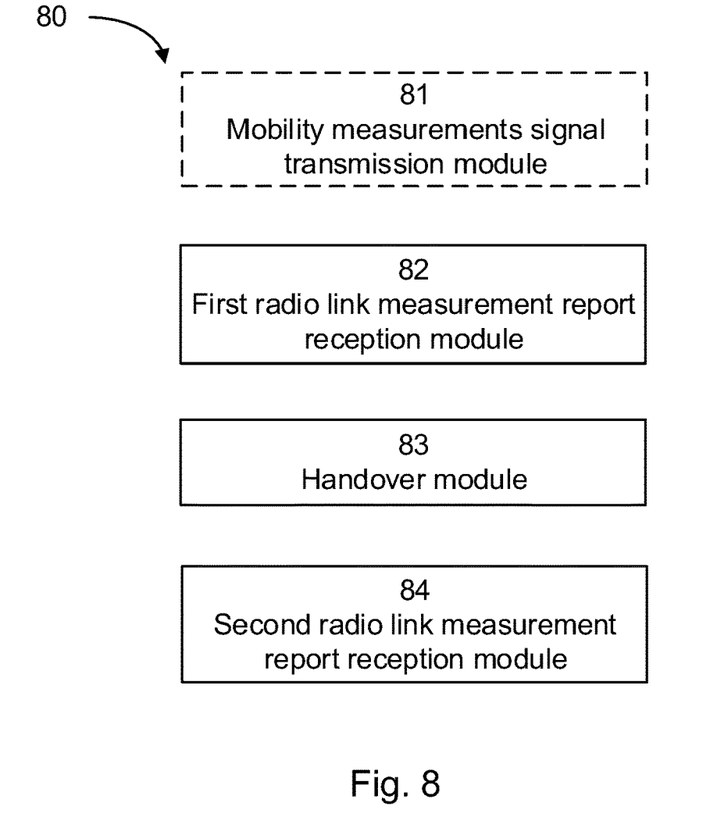
FIG. 8 illustrates an example node configuration for an access node.

FIG. 8 illustrates an embodiment of an access node 80 configured for performing wireless device assisted handover from a source node to a target node. The access node 80 optionally comprises a mobility measurements signal transmission module 81 configured to transmit at least one signal for the purpose of mobility measurements for a corresponding candidate radio link, a first radio link measurement reception module 82 configured to receive a first radio link measurement report comprising an initial target link for the wireless device, wherein the first radio link measurement report is received through a first radio link reporting mechanism, a handover module 83 configured to perform handover of the wireless device to the initial target link; and a second radio link measurement reception module 84 configured to receive a second radio link measurement report for one or more candidate links, e.g., comprising the initial target link, wherein the second radio link measurement report is received through a second radio link reporting mechanism different from the first radio link reporting mechanism.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, for use in a wireless device, for performing wireless device assisted handover from a source access node to a target access node, the method comprising the wireless device:
    performing one or more mobility measurements for corresponding one or more candidate radio links;
    selecting, from the one or more candidate radio links, an initial target link based on the performed one or more mobility measurements;
    transmitting a first radio link measurement report, based on the one or more mobility measurements, identifying the initial target link using a physical layer reporting mechanism to the target access node providing the initial target link;
    initiating communication over the initial target link with the target access node;
    transmitting a second radio link measurement report for the one or more candidate radio to the target access node on the initial target link using a radio resource control reporting mechanism, the second radio link measurement report having additional information not included in the first radio link measurement report and based on the same one or more mobility measurements made prior to the initiation of communication with the target access node;
    receiving a handover command comprising a validated target link, wherein the validated target link is the initial target link or a handover target link based on the second radio link measurement report; and
    initiating communication over the validated target link.

2. The method of claim 1, wherein the performing one or more mobility measurements comprises measuring downlink reference signals for corresponding candidate radio links.

3. The method of claim 2, wherein the performing one or more mobility measurements further comprises:
    deriving downlink synchronization settings from downlink reference signals; and
    storing the derived synchronization settings for the candidate radio links.

4. The method of claim 3, wherein the performing of one or more mobility measurements for corresponding one or more candidate radio links further comprises storing downlink synchronization settings for all of the one or more candidate radio links.

5. The method of claim 1, wherein the physical layer radio link reporting mechanism is an uplink synchronization signal.

6. The method of claim 1, further comprising transmitting a second radio link measurement report, for the one or more candidate radio links, to the source access node.

7. A wireless device configured for performing wireless device assisted handover from a source access node to a target access node, the wireless device comprising:
   radio circuitry arranged for transmission and reception of radio signals;
   processing circuitry configured to, using the radio circuitry, cause the wireless device to:
      perform one or more mobility measurements for corresponding one or more candidate radio links;
      select, from the one or more candidate radio links, an initial target link based on the performed one or more mobility measurements;
      transmit a first radio link measurement report, based on the one or more mobility measurements, identifying the initial target link using a physical layer reporting mechanism to the source node;
      initiate communication over the initial target link with the target access node;
      transmit a second radio link measurement report for the one or more candidate radio links on the initial target link using a radio resource control reporting mechanism, the second radio link measurement report having additional information not included in the first radio link measurement report and based on the same one or more mobility measurements made prior to the initiation of communication with the target access node;
      receive a handover command comprising a validated target link, wherein the validated target link is the initial target link or a handover target link based on the second radio link measurement report; and
      initiate communication over the validated target link.

8. A method for use in an access node, for performing wireless device assisted handover from a source access node to a target access node, the method comprising the access node:
   receiving a first radio link measurement report from a wireless device comprising an initial target link for the wireless device, wherein the first radio link measurement report is received through a physical layer reporting mechanism;
   performing handover of the wireless device to the initial target link;
   receiving a second radio link measurement report for one or more candidate links, wherein the second radio link measurement report is received through a radio link radio resource control reporting mechanism, the second radio link measurement report having additional information not included in the first radio link measurement report and based on the same one or more mobility measurements made prior to the initiation of communication over the handover of the wireless device;
   determining a handover target link based on the second radio link measurement report;
   determining the handover target link is different from the initial target link; and
   initiating a handover procedure for handover to the handover target link.

9. The method of claim 8, further comprising transmitting downlink reference signals for corresponding candidate radio links.

10. An access node configured for performing wireless device assisted handover from a source access node to a target access node, the access node comprising:
   radio circuitry arranged for transmission and reception of radio signals;
   communications circuitry for transmission and reception of inter node communications signals;
   processing circuitry configured to, using the radio circuitry, cause the access node to:
      receive a first radio link measurement report from a wireless device comprising an initial target link for the wireless device, wherein the first radio link measurement report is received through a physical layer reporting mechanism;
      perform handover of the wireless device to the initial target link;
      receive a second radio link measurement report for one or more candidate links, wherein the second radio link measurement report is received through a radio resource control reporting mechanism, the second radio link measurement report having additional information not included in the first radio link measurement report and based on the same one or more mobility measurements made prior to the handover of the wireless device;
      determine the handover target link based on the second radio link measurement report;
      determine the handover target link is different from the initial target link; and
      initiate a handover procedure for handover to the handover target.

* * * * *